(12) United States Patent
Ito

(10) Patent No.: US 8,760,368 B2
(45) Date of Patent: Jun. 24, 2014

(54) THREE-DIMENSIONAL DISPLAY DEVICE, IMAGE PRODUCING DEVICE AND IMAGE DISPLAY SYSTEM

(75) Inventor: Katsuyuki Ito, Tokyo (JP)

(73) Assignee: Oki Data Corporation, Tokyo (JP)

( * ) Notice: Subject to any disclaimer, the term of this patent is extended or adjusted under 35 U.S.C. 154(b) by 1110 days.

(21) Appl. No.: 12/489,678

(22) Filed: Jun. 23, 2009

(65) Prior Publication Data

US 2009/0322741 A1    Dec. 31, 2009

(30) Foreign Application Priority Data

Jun. 27, 2008  (JP) ................................ 2008-168263

(51) Int. Cl.
*G09G 5/00*  (2006.01)
*G09G 3/34*  (2006.01)

(52) U.S. Cl.
USPC ................................................ 345/6; 345/84

(58) Field of Classification Search
CPC ............ G09G 2300/023; G02G 3/003; H04N 13/0488–13/0495; H04N 13/0404–13/0406
USPC ................ 345/1.1–9, 32, 204–215, 690–699, 345/87–104; 359/462–470; 348/51–54
See application file for complete search history.

(56) References Cited

U.S. PATENT DOCUMENTS

| | | | |
|---|---|---|---|
| 6,714,173 B2* | 3/2004 | Shinoura | 345/32 |
| 7,426,068 B2* | 9/2008 | Woodgate et al. | 359/237 |
| 7,701,637 B2* | 4/2010 | Redert | 359/621 |
| 7,859,484 B2* | 12/2010 | Ito | 345/6 |
| 7,995,166 B2* | 8/2011 | Uehara | 349/113 |
| 2004/0100564 A1* | 5/2004 | Voss et al. | 348/220.1 |
| 2007/0229495 A1* | 10/2007 | Ito | 345/419 |

FOREIGN PATENT DOCUMENTS

| | | |
|---|---|---|
| JP | 07-064020 A | 3/1995 |
| JP | 10-319240 A | 12/1998 |
| JP | 2000-162971 A | 6/2000 |
| JP | 2002-518914 A | 6/2002 |
| JP | 2007-264316 A | 10/2007 |

\* cited by examiner

*Primary Examiner* — Alexander Eisen
*Assistant Examiner* — Patrick F Marinelli
(74) *Attorney, Agent, or Firm* — Muncy, Geissler, Olds & Lowe, P.C.

(57) ABSTRACT

A three-dimensional display device comprises pixel blocks where pixels having a plurality of dots are arranged to be matrix, respectively, a display body formed in a matter that the pixel blocks are arranged in a matrix, lens blocks where a plurality of lenses are arranged to be matrix corresponding to the pixels, respectively, and a lens panel formed in a manner that the lens blocks are arranged in a matrix. A three-dimensional image is displayed by maintaining the display body and the lens panel at predetermined intervals so as to correspond the arrangement positions of the pixel blocks with those of the lens blocks on the matrix, concurrently, and by spatially matching virtual images of the dots, the virtual images being produced by a plurality of the lenses whose arrangement positions are the same among a plurality of the lens blocks.

22 Claims, 6 Drawing Sheets

| Arrangement within blocks | ×1 | ×2 | ×3 | ×4 | ×5 | ×6 | ×7 | ×8 | ×9 |
|---|---|---|---|---|---|---|---|---|---|
| Number of coordinate shifts S | 1 | 2 | 3 | 4 | 5 | 6 | 7 | 8 | 9 |
| Dot pitch p(μm) | 5.292 | 5.292 | 5.292 | 5.292 | 5.292 | 5.292 | 5.292 | 5.292 | 5.292 |
| Block pitch d(mm) | 0.508 | 0.508 | 0.508 | 0.508 | 0.508 | 0.508 | 0.508 | 0.508 | 0.508 |
| Magnification m:d/sp | 96.000 | 48.000 | 32.000 | 24.000 | 19.200 | 16.000 | 13.714 | 12.000 | 10.667 |
| Object distance a | 0.900 | 0.900 | 0.900 | 0.900 | 0.900 | 0.900 | 0.900 | 0.900 | 0.900 |
| Focal length f:ma(m-1) | 0.909 | 0.919 | 0.929 | 0.939 | 0.949 | 0.960 | 0.971 | 0.982 | 0.993 |
| Virtual distance b:f(m-1) | 86.400 | 43.200 | 28.800 | 21.600 | 17.280 | 14.400 | 12.343 | 10.800 | 9.600 |

| Arrangement within blocks | ×1 | ×2 | ×3 | ×4 | ×5 | ×6 | ×7 | ×8 | ×9 |
|---|---|---|---|---|---|---|---|---|---|
| Number of coordinate shifts S | 1 | 2 | 3 | 4 | 5 | 6 | 7 | 8 | 9 |
| Dot pitch p(μm) | 5.292 | 5.292 | 5.292 | 5.292 | 5.292 | 5.292 | 5.292 | 5.292 | 5.292 |
| Block pitch d(mm) | 0.508 | 0.508 | 0.508 | 0.508 | 0.508 | 0.508 | 0.508 | 0.508 | 0.508 |
| Magnification m:d/sp | 96.000 | 48.000 | 32.000 | 24.000 | 19.200 | 16.000 | 13.714 | 12.000 | 10.667 |
| Focal length f. | 0.91 | 0.91 | 0.91 | 0.91 | 0.91 | 0.91 | 0.91 | 0.91 | 0.91 |
| Object distance a:f(m-1)/m | 0.90 | 0.89 | 0.88 | 0.87 | 0.86 | 0.85 | 0.84 | 0.83 | 0.82 |
| Virtual distance b:f(m-1) | 86.40 | 42.75 | 28.19 | 20.92 | 16.55 | 13.64 | 11.56 | 10.00 | 8.79 |

Fig. 8

THREE-DIMENSIONAL DISPLAY DEVICE, IMAGE PRODUCING DEVICE AND IMAGE DISPLAY SYSTEM

CROSS REFERENCE TO RELATED APPLICATION

The present invention is related to, claims priority from, and incorporates by reference Japanese Patent Application No. 2008-168263, filed on Jun. 27, 2008.

TECHNICAL FIELD

The present invention relates to a three-dimensional display device, an image producing device, and an image display system enabling the observation of a three-dimensional image from a two-dimensional display body.

BACKGROUND

Recently, in order to improve realistic sensation and image realism, the development of a spatial image display device for spatially forming an image has proposed. A two-dimensional display system and a three-dimensional display system are available for spatial image display. A typical system for two-dimensional display is a head mounted display (HMD), which is a system to spatially form an image displayed on a display device in front of a viewer, and to observe its virtual images. In contrast, a three-dimensional display system is generally referred to as stereoscopic display or 3D display, and provides a virtual image displayed on a two-dimensional display with the appearance of depth.

The typical three-dimensional display system is an electronic hologram system. The electronic hologram system is a system in which an interference fringe is generated by the overlapping of a reference light, such as laser, with an object light from an object to be a subject for recording, and the interference fringe is recorded. A three-dimensional image is then reproduced by irradiating the reference light onto the interference fringe when displaying the image. This electronic hologram system is a three-dimensional display system expected as a stereoscopic display system, which is natural to the human visual function. However, the technical hurdles to be overcome are high and it has not been practically used yet as an information processing device.

Similar to the electronic hologram system, another three-dimensional display system referred to as a virtual reality system is also available. This virtual reality system is a system where separate two-dimensional display devices are placed in front of the left and right eyes of a viewer, respectively. The images, corrected to form a three-dimensional image, are then displayed by the two-dimensional display devices (See, e.g., Japanese Patent Application Publication H10-319240).

However, the virtual reality system is a three-dimensional display system using binocular parallax, and it is necessary to use a display means or deflection spectacles etc. In the display means, a display unit, which shows different images in front of left and right eyes of the viewer, is positioned on a face of the viewer. Further, in the virtual reality display system, focusing adjustment to a three-dimensional image is not conducted, and a distance to a point of convergence and a distance of the focal point from eyes of an observer do not necessarily match. In other words, since the angle of convergence to determine the depth of the three-dimensional image may not correspond to a three-dimensional image position, an unnatural three-dimensional image can be displayed, causing eye strains and/or discomfort to the viewers.

SUMMARY

The present invention has been accomplished by taking these circumstances into consideration, and the objective of the present invention is to provide a three-dimensional display device that can display a natural three-dimensional image to a viewer.

In order to solve the problem, a three-dimensional display device related to the present application comprises pixel blocks where pixels having a plurality of dots are arranged to be matrix, respectively, a display body formed in a matter that the pixel blocks are arranged in a matrix, lens blocks where a plurality of lenses are arranged to be matrix corresponding to the pixels, respectively, and a lens panel formed in a manner that the lens blocks are arranged in a matrix. Wherein a three-dimensional image is displayed by maintaining the display body and the lens panel at redetermined intervals so as to correspond the arrangement positions of the pixel blocks with those of the lens blocks on the matrix, concurrently, and by spatially matching virtual images of the dots, the virtual images being produced by a plurality of the lenses whose arrangement positions are the same among a plurality of the lens blocks.

The three-dimensional display device of the present invention comprises pixel blocks where pixels having a plurality of dots are arranged in a matrix-state, a display body formed by arranging the pixel blocks in a matrix, lens blocks where a plurality of lenses is arranged in a matrix in correspondence with the pixels, and a lens panel is formed by arranging the lens blocks in a matrix. The three-dimensional display device of the present invention can display a three-dimensional image by maintaining intervals between respective pixels and lenses to be constant and concurrently, by spatially matching virtual images to be produced by a plurality of the lenses whose arrangement positions are the same among a plurality of the lens blocks.

Further, a three-dimensional display device related to the present application comprises a display body including a plurality of pixel blocks arranged in a pixel block array, each of the pixel blocks including a plurality of pixels arranged in an m×m pixel matrix, each of the pixels including a plurality of dots arranged in an n×n dot matrix; and a lens panel including a plurality of lens blocks arranged in a lens block array, each lens block array including a plurality of lenses arranged in an m×m lens array, each of the plurality of lenses corresponding one of the plurality of pixels in a corresponding pixel block, wherein a three-dimensional image is displayed by maintaining the display body and the lens panel at predetermined interval, wherein the arrangement of the lens blocks in the lens block array corresponds to the arrangement of the pixel blocks in the pixel block array, wherein the arrangement of the lenses in each of the lens arrays corresponds to the arrangement pixels in each of the pixel arrays, wherein virtual images of the dots produced by a plurality of lenses whose arrangement positions are the same among a plurality of lens blocks are spatially matched, and wherein m and n are both integers greater than 1.

The three-dimensional display device of the present invention is equipped with pixel blocks where pixels comprising n rows×n columns of dots are arranged in m rows×m columns, a display body formed by arranging the pixel blocks in a matrix (or in a matrix-state), lens blocks where m rows×m columns of lenses are arranged in a matrix relative to the pixels, and a lens panel formed by arranging the lens blocks in a matrix. The three-dimensional display device of the present invention can display a three-dimensional image by maintaining the intervals of the respective pixels with lenses to be constant and by spatially matching virtual images produced by a plurality of the lenses whose arrangement positions are the same among a plurality of the lens blocks.

Further, an image producing device related to the present application comprises an information processing device configured to produce a plurality of two-dimensional image data with different degrees of depth based on entered three-dimensional image data, and configured to convert the plurality of two-dimensional image data into three-dimensional display data; and an image forming device configured to form a printed body by printing pixel blocks and a display body on a medium, wherein pixels having a plurality of dots are arranged in a matrix based on the three-dimensional display data in the printing pixels, and wherein the display body is formed such that the pixel blocks are arranged in a matrix.

The image producing device of the present invention converts entered three-dimensional image data into three-dimensional display data; and forms a printed body by printing pixel blocks where pixels having a plurality of dots are arranged in a matrix and a display body formed by arranging the pixel blocks in a matrix based upon the three-dimensional display data on a medium.

Further, an image producing device related to the present application comprises an information processing device configured to produce a plurality of two-dimensional image data each having a different degree of depth based on entered three-dimensional image data, and configured to convert the plurality of two-dimensional image data into three-dimensional display data; and an image forming device configured to form a printed body by printing pixel blocks and a display body on a medium, wherein pixels having an n×n array of dots are arranged in an m×m pixel matrix based on the three-dimensional display data in the printing pixels, and the display body is formed such that the pixel blocks are arranged in a block matrix, and wherein m and n are both integers greater than 1.

The image producing device of the present invention converts entered three-dimensional image data into three-dimensional display data, and forms a printed body by printing pixel blocks where pixels having n rows×n columns of dots are arranged to be in m rows×m columns and a display body formed by arranging the pixel blocks in a matrix based upon the three-dimensional display data onto a medium.

Further, an image display system related to the present application comprises an information processing device that processes a plurality of two-dimensional image data with different degrees of depth based on entered three-dimensional image data, and that converts the plurality of two-dimensional image data into three-dimensional display data, an image forming device that forms a printed body by printing pixel blocks and a display body on a medium, wherein pixels having a plurality of dots are arranged in a dot matrix based upon the three-dimensional display data in the pixel blocks, and a wherein display body is formed such that the pixel blocks are arranged in a pixel block matrix, and a three-dimensional display device that has lens blocks in which a plurality of lenses are arranged in a matrix in correspondence with the pixels and a lens panel formed such that the lens blocks are arranged in a lens block matrix, that maintains the printed body and the lens panel at predetermined interval so as to correspond the arrangement positions of the pixel blocks with those of the lens blocks on the lens block matrix, and that displays a three-dimensional image by spatially matching virtual images of the dots produced by a plurality of the lenses whose arrangement positions are the same among a plurality of the lens blocks.

The image display system of the present invention converts entered three-dimensional image data into three-dimensional display data; and forms a printed body by printing pixel blocks where pixels having a plurality of dots are arranged in a matrix and a display body formed by arranging the pixel blocks in a matrix based upon the three-dimensional display data onto a medium. Then, the image display system is equipped with lens blocks where a plurality of lens are arranged in a matrix in correspondence with the pixels and a lens panel formed by arranging the lens blocks in a matrix, and a three-dimensional image is displayed by maintaining the printed body and the lens panel at predetermined intervals that the arrangement positions of the pixel blocks correspond with those of the lens blocks on the matrix and concurrently, by spatially matching virtual images of the dots produced by a plurality of the lenses whose arrangement positions are the same among a plurality of the lens blocks.

Further, an image display system related to the present application comprises an information processing device configured to process a plurality of two-dimensional image data with different degrees of depth based on entered three-dimensional image data, and configured to convert the plurality of two-dimensional image data into three-dimensional display data, and an image forming device configured to form a printed body by printing a plurality of pixel blocks and a display body on a medium, wherein pixels, each having an n×n matrix of dots, are arranged in m×m pixel matrices based upon the three-dimensional display data to form the pixel blocks, and wherein a display body is formed such that the pixel blocks are arranged in a pixel block matrix, a three-dimensional display device that has lens blocks in which a plurality of lenses are arranged in lens matrices in correspondence with the pixel matrices to form the lens blocks, and a lens panel formed such that the lens blocks are arranged in a lens block matrix, the three-dimensional display device being configured to display a three-dimensional image by spatially matching virtual images of the dots produced by a plurality of the lenses whose arrangement positions are the same among a plurality of the lens blocks, wherein the three-dimensional display device maintains the printed body and the lens panel at predetermined interval so as to correspond the arrangement positions of the pixel blocks in the pixel matrices with those of the lens blocks on the lens matrices, and wherein m and n are both integers greater than 1.

The image display system of the present invention converts entered three-dimensional image data into data for a three-dimensional display, and form a printed body by printing pixel blocks where pixels having n rows×n columns of dots are arranged to be in m rows×m columns and a display body formed by arranging the pixel blocks in a matrix based upon the three-dimensional display data onto a medium. Then, the image display system is equipped with lens blocks where a plurality of lenses are arranged in a matrix by corresponding to the pixels and a lens panel formed by arranging the lens blocks in a matrix, and a three-dimensional image is displayed by maintaining the printed body and the lens panel at predetermined intervals so that the arrangement positions of the pixel blocks correspond with those of the lens blocks on the matrix and concurrently, by spatially matching virtual images of the dots produced by a plurality of lenses whose arrangement positions are the same among the plurality of lens blocks.

According to the disclosed three-dimensional display devices, since the virtual images produced by a plurality of lenses whose arrangement position are the same are spatially matched among a plurality of lens blocks, a natural three-dimensional image can be displayed to a viewer.

BRIEF DESCRIPTION OF DRAWINGS

FIG. 8 is a table showing calculation results of object distance a according to disclosed embodiments.

DETAILED DESCRIPTION

Embodiments of the present invention are explained hereafter with reference to the drawings. Further, the present invention is not limited to the descriptions described below, but various changes may be made without departing from the scope of the invention.

Moreover, the instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued. It is further understood that the use of relational terms such as first and second, and the like, if any, are used solely to distinguish one from another entity, item, or action without necessarily requiring or implying any actual such relationship or order between such entities, items or actions.

It is noted that some embodiments may include a plurality of processes or steps, which can be performed in any order, unless expressly and necessarily limited to a particular order; i.e., processes or steps that are not so limited may be performed in any order. Some of the inventive functionality and some of the inventive principles when implemented, may be supported with or in software or integrated circuits (ICs), such as a digital signal processor and software therefore, and/or application specific ICs, or a combination thereof.

It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the exemplary embodiments.

First Embodiment

Figure 1A:
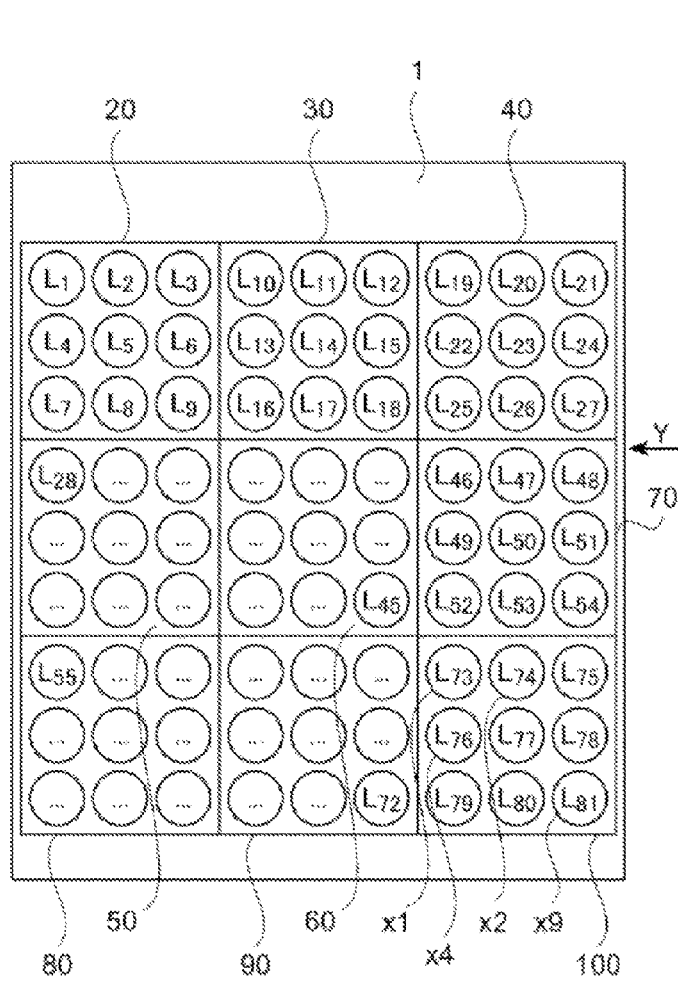
FIG. 1A illustrates a schematic configuration of a lens panel in a three-dimensional display device according to disclosed embodiments.
Figure 1B:
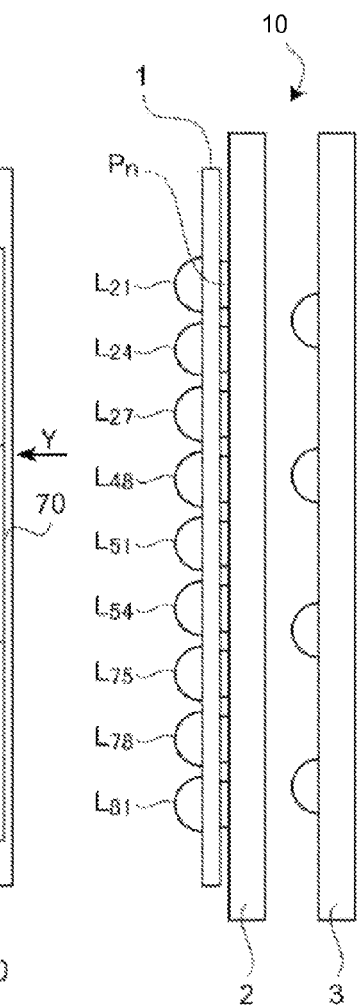
FIG. 1B illustrates a cross-sectional view of three-dimensional display device according to disclosed embodiments.

FIG. 1A illustrates a schematic configuration of a lens panel 1 in a three-dimensional display device 10 according to disclosed embodiments; and FIG. 1B illustrates a cross-sectional view of three-dimensional display device 10 according to disclosed embodiments, which includes the lens panel 1 of FIG. 1A, as seen from the direction indicated by Y in FIG. 1A. As shown in FIG. 1A and FIG. 1B, a three-dimensional display device 10 is equipped with a lens panel 1, a two-dimensional display body 2 as a display body and a backlight 3.

The lens panel 1, as illustrated in FIG. 1A, is composed of a plurality of lenses $L_n$ (where n is an integer), such as aspheric lens. The lenses $L_n$ are arranged two-dimensionally at regular intervals, and are integrally formed with optical plastics, such as light curing resin or thermosetting resin. The lenses $L_n$ are formed into lens blocks 20, . . . , 100 that each have a total of 9 lenses in three rows×three columns (e.g., lens block 20 includes lenses $L_1$ to $L_9$). The lens blocks 20, . . . , 100 are themselves formed into an array of three rows×three columns in the lens panel 1. In common among the lens blocks 20, . . . , 100, $L_n$ (×1) to $L_n$ (×9) indicate sequentially lens positions in three rows×three columns from the top left lens of the lens block to the lower right lens of the lens block.

The focal lengths f of the lenses $L_n$ (×1) to $L_n$ (×9) comprising each of the lens blocks 20, . . . , 100 are different, and are designed to grow longer across each of the lens block 20, . . . , 100.

Furthermore, the lens arrangement configuration with different focal length is common among the lens blocks 20, . . . , 100. In other words, the focal length of the lens $L_n$ (×1) in each lens block is the same. Similarly, it is designed such that the focal lengths of the lens $L_n$ (×2) to $L_n$ (×9) in each lens block are the same, respectively.

Since each lens block is arranged similarly, the lenses, which are positioned in such a set arrangement, may be simply referred to as lenses $L_n$ (×1) to $L_n$ (×9).

Figure 2:
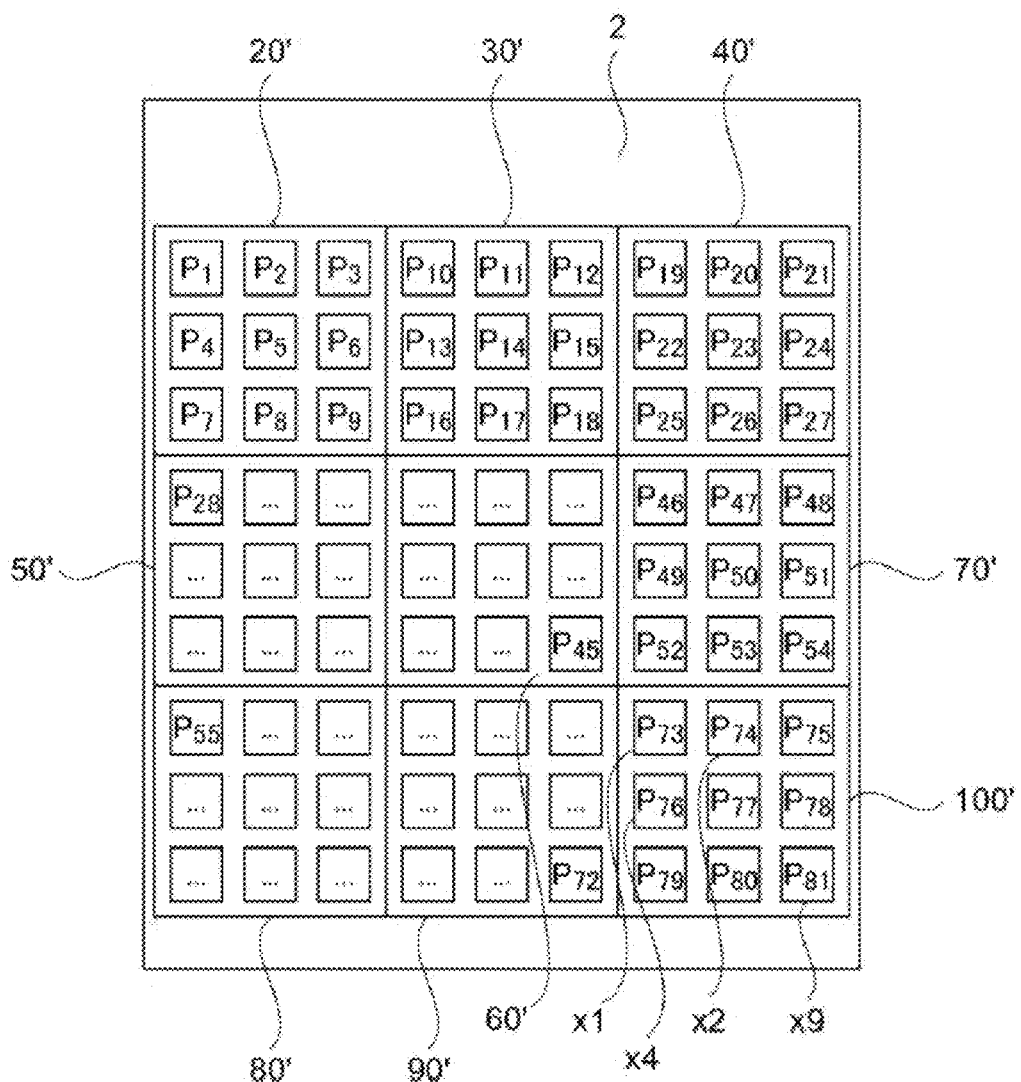
FIG. 2 illustrates a schematic configuration of a two-dimensional display body according to disclosed embodiments.

A two-dimensional display body 2 is explained hereafter. The two-dimensional display body 2, as illustrated in FIG. 2, is composed of a plurality of pixels $P_n$ (n is an integer). Each of the pixels $P_n$ is composed of a plurality of dots that are alighted two-dimensionally at regular intervals. The two-dimensional display body 2 is similar to the lens panel 1 in that pixel blocks 20', . . . , 100' are formed in an array of three rows×three columns, and each pixel block 20', . . . , 100' includes nine pixels $P_n$ in three rows×three columns. In particular, the pixels $P_n$ comprising each pixel block 20', . . . , 100' are arranged so as to correspond to the arrangement position of each lens of the lens block 1. In other words, for example, the pixel $P_1$ (×1) of the pixel block 20' is arranged so as to correspond to the lens $L_1$ (×1) of the lens block 20. Similarly, pixels $P_2$ (×2), $P_3$ (×3), $P_4$ (×4), $P_5$ (×5), $P_6$ (×6), $P_7$ (×7), $P_8$ (×8), and $P_9$ (×9) of the pixel block 20' are arranged so as to correspond to the arrangement positions of the lenses $L_2$ (×2), $L_3$ (×3), $L_4$ (×4), $L_5$ (×5), $L_6$ (×6), $L_7$ (×7), $L_8$ (×8), and $L_9$ (×9) of the lens block 20, respectively.

As with the lens blocks 20, . . . , 100, (×1) to (×9) are sequential numbers for the pixels arranged from the top left side of the pixel block to the lower right side of the pixel block. As a result, the pixels positioned in the specific arrangement position may be simply referred to as pixels $P_n$ (×1 to ×9). Further, since an array pitch of each pixel block and that of each lens block are designed to be equal, the arrangement positions of all pixels $P_n$ in each pixel block and all lenses $L_n$ in each lens block are matched.

Figure 3:
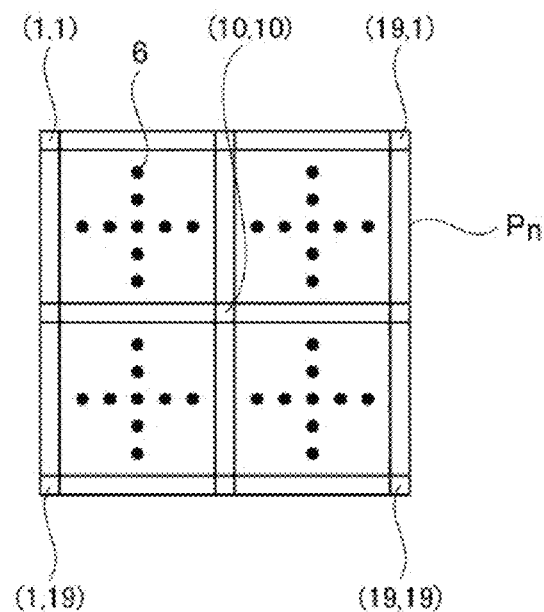
FIG. 3 illustrates coordinate positions of dots according to disclosed embodiments.

FIG. 3 illustrates coordinate positions of dots 6 comprising each pixel $P_n$ in FIG. 2. The dots 6 comprise a matrix in 19 rows×19 columns arrayed, for example, from the coordinates (1,1) to the coordinates (19,19). The coordinates of the center dot is (10,10) at this time, and the center of each lens, i.e., an optical axis passes through the center dot of each pixel.

A backlight 3 is a thin surface-emitting device equipped with, for example, electroluminescence (EL) or a light emitting diode (LED), and functions as a light source to uniformly irradiate a light to the two-dimensional display body 2.

The lens panel 1 and the two-dimensional display body 2 equipped with such configurations are arranged in parallel with a predetermined interval between them, as illustrated in FIG. 1B. As shown in FIG. 1B the three-dimensional display device 10 is configured to stack the lens panel 1, the two-dimensional display body 2 and the backlight 3 at predetermined intervals.

The two-dimensional display body 2 mentioned above can form an image based upon three-dimensional display data by printing an image based upon the three-dimensional display data onto a predetermined medium, for example, a film medium. An image producing device 200 enabling the formation of a printed body as the two-dimensional display body 2 is explained below.

Figure 4:
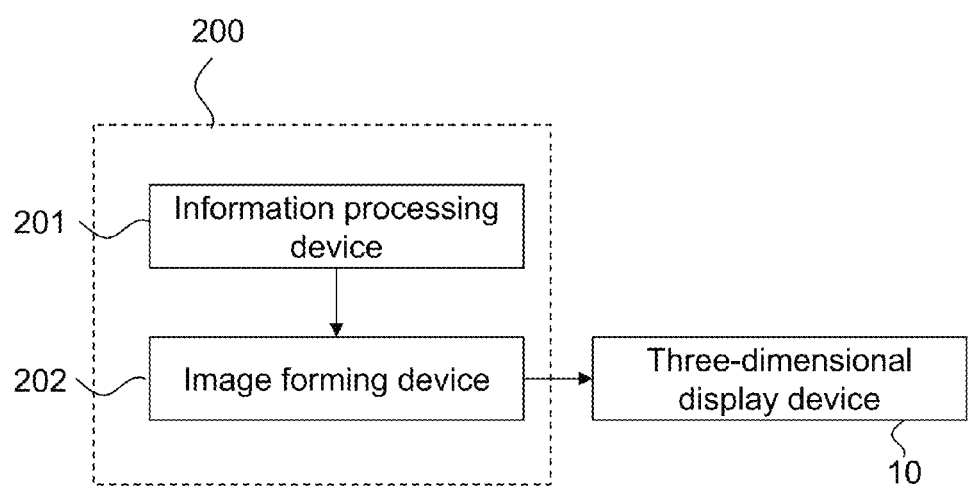
FIG. 4 is a block diagram illustrating a configuration of an image producing device according to disclosed embodiments.

FIG. 4 is a block diagram illustrating the configuration of the image producing device 200. The image producing device 200 is equipped with an information processing device 201 for producing three-dimensional display data, and an image forming device 202 for printing an image based upon the three-dimensional display data produced by the information processing device 201 onto a predetermined medium.

The information processing device 201 produces two-dimensional image data of nine screens with different degrees of depth from the entered three-dimensional image data. Further, the information processing device 201 converts the produced two-dimension image data into three-dimensional display data by a conversion method described below. The converted three-dimensional display data is then output to the image forming device 202.

The image forming device 202 can be any suitable device for forming an image including, but not limited to a printer, such as an offset printer or an inkjet printer. The image forming device 202 forms a printed body as the two-dimensional display body 2 by printing an image based upon the three-dimensional display data entered into the information processing device 201 onto a predetermined medium. Here, each dot 6 that comprises a pixels $P_n$ of the printed body is a color dot, and expresses dark and light gradation of the three-dimensional image to be displayed. Furthermore, a region other than the pixels where the color dots are printed is printed with black color, and a light to be irradiated from the backlight 3 is blocked so as not to transmit through the lens side.

Then a printed body, such as the two-dimensional display body 2 printed by the image forming device 202, is incorporated into the three-dimensional display device 10. The irradiation of a light by the backlight 3 then enables the display of a three-dimensional image.

Figures 5, 6:
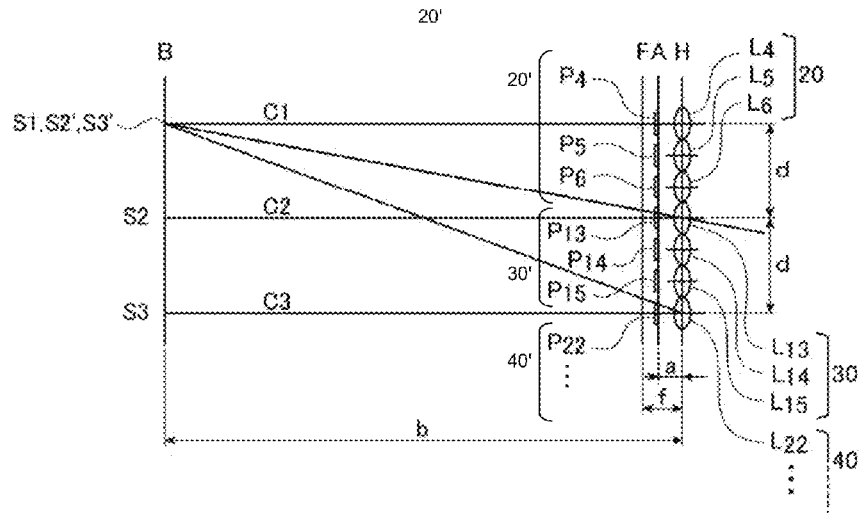
FIG. 5 is a schematic view illustrating a technique to spatially match virtual images produced by a plurality of lenses whose arrangement positions are the same among a plurality of lens blocks according to disclosed embodiments.
FIG. 6 is a table showing calculation results of focal length f according to disclosed embodiments.

Next, a technique to spatially match virtual images produced by a plurality of lenses whose arrangement positions are the same among a plurality of lens blocks is explained with reference to FIG. 5. As shown in FIG. 5, a principal point surface H includes a principal point position of the lens $L_n$, and an object surface A represents a two-dimensional display body 2 including the pixels $P_n$. In this representation, the lens blocks 20, 30 and 40 and the pixel blocks 20', 30' and 40' corresponding to the lens blocks are shown by way of example. The lenses $L_4$, $L_{13}$ and $L_{22}$ arranged in the lens blocks 20, 30 and 40 in this drawing are the lenses $L_n$ (×4), and the focal length f of these lenses is designed to be equal.

Furthermore, the pixel $P_4$ (×4) of the pixel block 20', the pixel $P_{13}$ (×4) of the pixel block 30', and the pixel $P_{22}$ (×4) of the pixel block 40' correspond to the lens $L_4$ (×4), the lens $L_{13}$ (×4) and the lens $L_{22}$ (×4), respectively. The optical axes of the lens $L_4$ (×4), the lens $L_{13}$ (×4) and the lens $L_{22}$ (×4) are represented by C1, C2 and C3, respectively, and distances among the lens blocks and among the pixel blocks is represented by d, respectively. In addition, when a distance (i.e., an object distance) between the principal surface H and the object surface A is represented by a and a distance (virtual image surface) between a virtual surface B and the principal surface H is represented by b, the following expression is formed according to the lens formula:

$$\frac{1}{a} - \frac{1}{b} = \frac{1}{f} \qquad (1)$$

In addition, the magnification is m can be obtained from the following equation:

$$b = m \cdot a \qquad (2)$$

The following equalities can then be determined from equations (1) and (2):

$$b = f(m-1), \ a = f\left(1 - \frac{1}{m}\right) \qquad (3)$$

Provided that (a<f) in the relationship of the virtual image.

As noted above, the focal length f and the object distance a are equal for each respective optical axis C1, C2 and C3. As a result, the virtual distance b also becomes equal. Therefore, virtual images S1, S2 and S3 of the pixels $P_4$ (×4), $P_{13}$ (×4) and $P_{22}$ (×4) are formed on the same virtual image surface B.

It is then possible to determine a dot position in each pixel $P_n$ so as to overlap the virtual images S2 and S3 by the optical axes C2 and C3 at the position of the virtual image S1 by the optical axis C1 formed on the virtual image surface B.

Here, in the pixel coordinates, the number of coordinate shifts from the center position of the dot 6 is represented by s. The symbol s is an integer that represents the number of coordinate shifts as a value from 1 to 9 in vertical and horizontal directions, respectively. Furthermore, the pitch where the dots 6 in each pixel $P_n$ are aligned is represented by p and the number of block shifts of the lens block and the pixel block is represented by n, respectively. If the longitudinal magnification and the lateral magnification are equalized as shown in equation (2), the magnification m will meet the relationship of the following expression:

$$m = \frac{b}{a} = \frac{d}{s \cdot p} = \frac{n \cdot d}{n \cdot s \cdot p} \qquad (4)$$

For example, in FIG. 5, the number of block shifts n is 1 in the optical axis C2, and the number of block shifts n is 2 in the optical axis C3, with regard to the optical axis C1. In other words, the equation of $$\frac{d}{s \cdot p} \text{ or } \frac{n \cdot d}{n \cdot s \cdot p}$$

with the magnification m matching the virtual images S2 and S3 of the dots 6 by the optical axes C2 and C3 with the virtual image S1 of the dots 6 of the optical axis C1 as S2' and S3'.

The relationship in FIG. 5 is more explained in more detail below. When the number of coordinate shifts s is 4 and the coordinates (10,10) of the center dots of the pixel $P_4$ (×4) corresponding to the optical axis C1 are referenced, in the pixel $P_{13}$ (×4) corresponding to the optical axis C2, the dots 6 having coordinates (6,10) 4p away toward the optical axis C1 from the coordinate position (10,10) of the center dot are designated. Likewise, in the pixel $P_{22}$ (×4) corresponding to the optical axis C3, the dot 6 in the coordinates (2,10) 8p away toward the optical axis C1 from the coordinate position (10,10) of the center dot is designated. The virtual images S2 and S3 designated by the dots 6 in these pixels $P_{13}$ (×4) and $P_{22}$ (×4) overlap with the virtual image S1 by the optical axis C1 on the virtual image surface B as S2' and S3'.

At this time, since the number of coordinate shifts s is 4 and the number of block shifts n of the optical axis C2 relative to the optical axis C1 is 1 and the number of block shifts n of the optical axis C3 relative to the optical axis C1 is 2, m can be determined by equation for (4) to be $$m = \frac{b}{a} = \frac{d}{4p} = \frac{2d}{8d}.$$

Furthermore, virtual images S1, S2 and S3 are observed as m times the size of dot 6.

The virtual image relationship by the dots 6 of each pixel $P_n$ explained below is realized among other pixel blocks positioned above and below and left and right relative to the pixel block positioned in one arrangement position. Therefore, for example, in 5×5 pieces of pixel blocks, which are above and below and left and right pixel blocks relative to the pixel block 20' including the center pixel $P_4$ (×4), a total of 25 of virtual images can be overlapped by selecting the coordinate positions of the dots 6 within the pixel $P_n$ (×4) of each pixel block. Thus, each pixel within the pixel block corresponding to each lens block can be a center pixel and concurrently plays the role of peripheral lens blocks and pixel blocks with regard to the center pixel.

In the first embodiment of the present invention, although the focal length f of the lenses $L_n$ arranged in the same arrangement position is the same among each lens block, the object distance a is fixed and the focal length f can be set at a predetermined value in the lens $L_n$ (×1) to lens $L_n$ (×9) within a lens block. In the pixel block, the number of coordinate shifts s of the pixel $P_n$ (×1), the number of coordinate shifts s of the pixel $P_n$ (×2), the number of coordinate shifts s of the pixel $P_n$ (×3), the number of coordinate shifts s of the pixel $P_n$ (×4), the number of coordinate shifts s of the pixel $P_n$ (×5), the number of coordinate shifts s of the pixel $P_n$ (×6), the number of coordinate shifts s of the pixel $P_n$ (×7), the number of coordinate shifts s of the pixel $P_n$ (×8) and the number of coordinate shifts s of the pixel $P_n$ (×9) are set to be 1, 2, 3, 4, 5, 6, 7, 8 and 9, respectively. In this case, the focal length from the lens $L_n$ (×1) to the lens $L_n$ (×9) can be calculated using equations (2), (3) and (4). The results of such calculations are shown in FIG. 6.

In these calculations, the dot pitch p is 5.292 μm, equivalent to 4,800 dots/inch, and the inter-block pitch, which is the distance between the lens block and between the pixel block, is 0.508 mm, equivalent to 50 dots/inch. Furthermore, the lens block and the pixel block are composed with lenses $L_n$ and pixels $P_n$ in 3 rows×3 columns, respectively. The object distance a is 0.9 mm; the magnification m is obtained using equation (4); and the focal length f (in units of mm) is obtained with using the equation $$f = \frac{m \cdot a}{m - 1} \quad (5)$$

using the obtained magnification m. In addition, the virtual distance b (in units of mm) is obtained using equation (3) and the obtained focal length f.

Next, the process executed by the image producing device 200 that produces three-dimensional display data based upon the entered three-dimensional image data is explained.

The image creating device 200 is equipped with the image processing device 201 and the image forming device 202, and the information processing device 201 produces two-dimensional image data of nine screens with difference degrees of depth from the entered three-dimensional image data. Furthermore, in the first embodiment, within the lens block, since the lenses $L_n$ (×1) to $L_n$ (×9) are arranged in respective order from shorter to longer focal length f the information processing device 201 produces two-dimensional image data of nine screens in respective order with longer virtual image length b. In addition, the information processing device 201 converts the produced two-dimensional image data into three-dimensional display data composed of color data of dots 6. This conversion method is explained below.

In the pixel $P_n$ (×1), the information processing device 201 determines the color data of the center dot (10,10) of the dot coordinates from the two-dimensional image data. The dots 6 positioned at other coordinate positions have the same level of color data of the center dot of the pixel $P_n$ (×1) included in the adjacent pixel block (n·d) away in the same direction, by corresponding to the distance (n·p) away from the center dot 6 when the number of coordinate shifts s is 1. In a similar way, color data of all dots 6 in 19 rows×19 columns are similarly obtained.

In the pixel $P_n$ (×2), dots in 2 rows×2 columns by the dots 6 are regarded as a basic configuration for the dot coordinates. For example, in the information processing device 201, the center dots in 2 rows×2 columns are composed of the dots 6 at (10,10), (10,11), (11,10) and (11,11). Color data of the center dots in 2 row×2 columns is determined from the two-dimensional image data. The dots in 2 rows×2 columns positioned in other coordinate positions have the same level of color data as the center dots of the pixel $P_n$ (×2) included in the adjacent pixel block (n·d) away in the same direction, corresponding to the distance (n·2p) away from the center dot when the number of coordinate shifts s is 2. Color data to all 2 rows×2 columns of dots are similarly obtained.

In the pixel $P_n$ (×3), dots in 3 rows×3 columns by the dots 6 are regarded as a basic configuration for the dot coordinates. The information processing device 201 determines the color data of the center dots in 3 rows×3 columns from the two-dimensional image data. The dots in 3 rows×3 columns positioned at other coordinate positions have color data that is at the same level as that of the center dot of the pixel $P_n$ (×3) included in the adjacent pixel block (n·d) away in the same direction, corresponding to the distance (n·3p) away from the center dot when the number of coordinate shifts s is 3. Color data to all dots in 3 rows×3 columns is similarly obtained.

In the pixel $P_n$ (×4), dots in 4 rows×4 columns by the dots 6 are regarded as a basic configuration for the dot coordinates. The information processing device 201 determines the color data of the center dots in 4 rows×4 columns from the two-dimensional image data. The dots in 4 rows×4 columns positioned at other coordinate positions have color data that is the same level as that of the center dot of the pixel $P_n$ (×4) included in the adjacent pixel block (n·d) away in the same direction, corresponding to the distance (n·4p) away from the center dot when the number of coordinate shifts s is 4. Color data to all dots in 4 rows×4 columns is similarly obtained.

In the pixel $P_n$ (×5), dots in 5 rows×5 columns by the dots 6 are regarded as a basic configuration for the dot coordinates. The information processing device 201 determines the color data of the center dots in 5 rows×5 columns from the two-dimensional image data. The dots in 5 rows×5 columns positioned at other coordinate positions have color data that is the same level as that of the center dot of the pixel $P_n$ (×5) included in the adjacent pixel block (n·d) away in the same direction, corresponding to the distance (n·5p) away from the center dot when the number of coordinate shifts s is 5. Color data to all dots in 5 rows×5 columns is similarly obtained.

In $P_n$ (×6) to $P_n$ (×9), color data is similarly obtained. However, as illustrated in FIG. 3, in the dot configuration in 19 rows×19 columns relating to this embodiment, if the dots in 6 rows×6 columns or greater are a basic configuration, the peripheral dots will be missing; however, in this case, the color data in the state with missing dots is obtained.

With respect to all pixel blocks comprising the two-dimensional display body 3, a summary of the color data from the pixel $P_n$ (×1) to the pixel $P_n$ (×9) converted with the technique is used as three-dimensional display data.

The information processing device 201 outputs the three-dimensional display data produced as mentioned above to the image forming device 202. The image forming device 202 where three-dimensional display data is entered produces the two-dimensional display body 2 by forming an image onto a clear substrate, for example, a film medium, based upon the three-dimensional display data.

The two-dimensional display body 2 formed by the image forming device 202 is incorporated into the three dimensional display device 10. Then, when a light is uniformly irradiated onto the two-dimensional display body 2 by the backlight 3, a viewer can observe a three-dimensional image having nine levels of depth. The three-dimensional image observed in this case is an image where the virtual images produced by a plurality of lenses $L_n$ overlap. Therefore, according to this embodiment, since this provides a state where a plurality of light beams can be reproduced as if from one point, the viewer can capture the light beams scattering from one point with both eyes and observe the three dimensional image in a natural state.

As described above, according to the first disclosed embodiment, a plurality of lenses $L_n$ whose focal lengths are different are aligned per lens block and a two-dimensional display body where dots based upon the display data are formed by correspondence is arranged at the arrangement position of the lenses $L_n$ by corresponding to the arrangement positions of the lenses $L_n$ and a plurality of virtual images overlap at the same positions by the lenses $L_n$ having the same level of the focal length in the plurality of lens blocks. In this way, the viewer can recognize the three-dimensional image by observing the light beams emitted from the plurality of lenses $L_n$. Since this design enables correspondence between the point of convergence and the three-dimensional image position, a natural three-dimensional image can be displayed to the viewer. Furthermore, when the viewer observes a three-dimensional image, a peripheral field of view other than the display means is not obstructed. This makes the first disclosed embodiment suitable for displaying work information.

Second Embodiment

A three-dimensional display device 10' relating to second embodiment of the present invention is produced by having a plurality of lens $L_n$ (×1)' to the lens $L_n$ (×9)' in all lens blocks of the lens panel 1' having equal focal lengths f. The principal point positions from the lens $L_n$ (×1)' to the lens $L_n$ (×9)' are shifted and the object distance $_a$, which is a gap from the object surface, is set to be sequentially shorter. In this case, it is designed such that the object distance a of the lens $L_n$ (×1)' among the lens blocks is all equal, and the object distance a from the lens $L_n$ (×2)' to the lens $L_n$ (×9)' are equal, respectively, as well. The other configuration is the same as in the first embodiment. Therefore, the same components are marked with the same symbols, and explanations will be omitted.

Figure 7A:
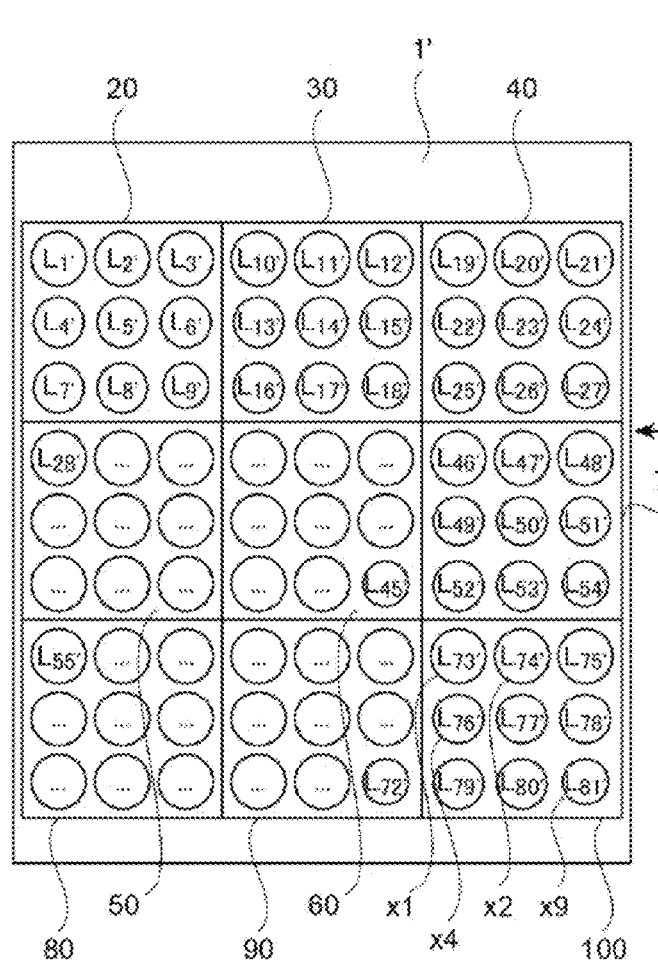
FIG. 7A illustrates a schematic configuration of a lens panel in a three-dimensional display device according to disclosed embodiments.
Figure 7B:
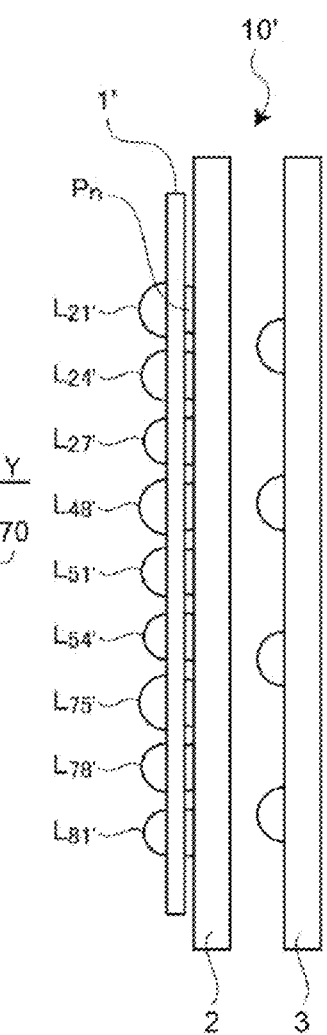
FIG. 7B illustrates a cross-sectional view of a three-dimensional display device according to disclosed embodiments.

The lens panel 1', as illustrated in FIG. 7A, is composed of lenses $L_n$' where lenses, such as a lenticular lens, are two-dimensionally aligned at regular intervals. It is integrally formed with optical plastics, such as light curing or thermo-setting resin. In order to shorten the object distance a, for example, as illustrated in FIG. 7B, if the depth of molds corresponding to the lens $L_n$ (×1)' to the lens $L_n$ (×9)' is sequentially narrower, the object distance a can be shortened.

In the second embodiment, although the object distances a of the lenses $L_n$' arranged at the same arrangement positions within each lens block are identical, the focal length f might be fixed and the object distance a might be set as a predetermined value in the lenses $L_n$' (×1) to $L_n$' (×9) within a lens block. In the pixel block, the number of coordinate shifts s of the pixel $P_n$ (×1), the number of coordinate shifts s of the pixel $P_n$ (×2), the number of coordinate shifts s of the pixel $P_n$ (×3), the number of coordinate shifts s of the pixel $P_n$ (×4), the number of coordinate shifts s of the pixel $P_n$ (×5), the number of coordinate shifts s of the pixel $P_n$ (×6), the number of coordinate shifts s of the pixel $P_n$ (×7), the number of coordinate shifts s of the pixel $P_n$ (×8) and the number of coordinate shifts s of the pixel $P_n$ (×9) are set to be 1, 2, 3, 4, 5, 6, 7, 8 and 9, respectively. In this case, each object distance a from the lens $L_n$ (×1)' to the lens $L_n$ (×9)' can be calculated using equations (2), (3) and (4). The calculation result is shown in FIG. 8.

In the calculation, the dot pitch p is 5.292 μm, equivalent to 4,800 dots/inch; and the inter-block pitch d, which is a distance between the lens block and between the pixel block, is 0.508 mm, equivalent to 50 dots/inch. Furthermore, the lens block and the pixel block are composed with lenses $L_n$ and pixels $P_n$ in 3 rows×3 columns, respectively. The focal length f is 0.91 mm, and the magnification m is obtained using equation (4). The object distance a (in units of mm) is obtained using equation (5) using the obtained magnification m. In addition, the virtual distance b (in units of mm) is obtained using equation (3) and the focal length f.

Next, the process executed by the image producing device 200 that produces three-dimensional display data based upon the entered three-dimensional image data is explained.

The image creating device 200 is equipped with the image processing device 201 and the image forming device 202, and the information processing device 201 produces two-dimensional image data of nine screens with difference degrees of depth from the entered three-dimensional image data. Furthermore, in the second embodiment, within the lens block, since the lens $L_n$ (×1)' to the lens $L_n$ (×9)' are arranged in respective order from a longer object distance a, the information processing device 201 produces two-dimensional image data of nine screens in respective order with longer virtual image length b. In addition, the information processing device 201 converts the produced two-dimensional image data into three-dimensional display data composed of color data of dots 6. This conversion method is explained below.

In the pixel $P_n$ (×1), the information processing device 201 determines the color data of the center dot (10,10) of the dot coordinates from the two-dimensional image data. The dots 6 positioned at other coordinate positions have the same level of color data of the center dot of the pixel $P_n$ (×1) included in the adjacent pixel block (n·d) away in the same direction, by corresponding to the distance (n·p) away from the center dot 6 when the number of coordinate shifts s is 1. Hereafter color data of all dots 6 in 19 rows×19 columns are similarly obtained.

In the pixel $P_n$ (×2), dots in 2 rows×2 columns of the dots 6 are regarded as a basic configuration for the dot coordinates. For example, in the information processing device 201, the center dots in 2 rows×2 columns are composed of the dots 6 at (10,10), (10,11), (11,10) and (11,11), and the color data of the center dots in 2 row×2 columns is determined from the two-dimensional image data. The dots in 2 rows×2 columns positioned in other coordinate positions have the same level of color data as the center dots of the pixel $P_n$ (×2) included in the adjacent pixel block (n·d) away in the same direction, by corresponding to the distance (n·2p) away from the center dot when the number of coordinate shifts s is 2. Color data to all 2 rows×2 columns of dots are similarly obtained.

In the pixel $P_n$ (×3), dots in 3 rows×3 columns of the dots 6 are regarded as a basic configuration for the dot coordinates. The information processing device 201 determines the color data of the center dots in 3 rows×3 columns from the two-dimensional image data. The dots in 3 rows×3 columns positioned at other coordinate positions have color data, which is the same level as that of the center dot of the pixel $P_n$ (×3) included in the adjacent pixel block (n·d) away in the same direction by corresponding to the distance (n·3p) away from the center dot when the number of coordinate shifts s is 3. Color data to all dots in 3 rows×3 columns is similarly obtained.

In the pixel $P_n$ (×4), dots in 4 rows×4 columns of the dots 6 are regarded as a basic configuration for the dot coordinates. The information processing device 201 determines the color data of the center dots in 4 rows×4 columns from the two-dimensional image data. The dots in 4 rows×4 columns positioned at other coordinate positions have color data, which is the same level as that of the center dot of the pixel $P_n$ (×4) included in the adjacent pixel block (n·d) away in the same direction by corresponding to the distance (n·4p) away from the center dot when the number of coordinate shifts s is 4. Color data to all dots in 4 rows×4 columns is similarly obtained.

In the pixel $P_n$ (×5), dots in 5 rows×5 columns of the dots 6 are regarded as a basic configuration for the dot coordinates. The information processing device 201 determines the color data of the center dots in 5 rows×5 columns from the two-dimensional image data. The dots in 5 rows×5 columns positioned at other coordinate positions have color data, which is the same level as that of the center dot of the pixel $P_n$ (×5) included in the adjacent pixel block (n·d) away in the same direction by corresponding to the distance (n·5p) away from the center dot when the number of coordinate shifts s is 5. Color data to all dots in 5 rows×5 columns is similarly obtained.

In pixels $P_n$ (×6) to $P_n$ (×9), the color data is similarly obtained. However, as illustrated in FIG. 3, in the dot configuration in 19 rows×19 columns relating to this embodiment, if the dots in 6 rows×6 columns or greater are a basic configuration, the peripheral dots will be missing. In this case, the color data in the state with missing dots is obtained.

With respect to all pixel blocks comprising the two-dimensional display body 3, a summary of the color data from the pixel $P_n$ (×1) to the pixel $P_n$ (×9) converted with the technique is used as three-dimensional display data.

The information processing device 201 outputs the three-dimensional display data produced as mentioned above to the image forming device 202. The image forming device 202 where three-dimensional display data is entered produces the two-dimensional display body 2 by forming an image onto a clear substrate, for example, a film medium, based upon this three-dimensional display data.

The two-dimensional display body 2 formed by the image forming device 202 is incorporated into the three dimensional display device 10'. Then, when light is uniformly irradiated onto the two-dimensional display body 2 by the backlight 3, a viewer can observe a three-dimensional image having nine levels of depth. The three-dimensional image observed in this case is an image where the virtual images produced by a plurality of lenses $L_n$' overlap. Therefore, according to this embodiment, since this provides a state where a plurality of light beams can be reproduced as if from one point, the viewer can capture the light beams scattering from one point with both eyes and observe the three dimensional image in a natural state.

As described above, according to the second embodiment, since a plurality of lenses $L_n$' whose focal length is different are aligned per lens block and a two-dimensional display body where dots based upon the display data are formed by corresponding is arranged in the arrangement position of the lenses $L_n$' by corresponding to the arrangement positions of the lenses $L_n$' and a plurality of virtual images are overlapped at the same positions by the lenses $L_n$' having the same level of the focal length in the plurality of lens blocks, the viewer can recognize the three-dimensional image by observing the light beams emitted from the plurality of lenses $L_n$'. Since this design enables correspondence between the point of convergence and the three-dimensional image position, a natural three-dimensional image can be displayed to the viewer. Furthermore, since when the viewer observes the three-dimensional image a peripheral field of view other than the display means is not obstructed, the first disclosed embodiment is suitable for displaying work information. In addition, according to the second disclosed embodiment, since the focal lengths f of all lenses $L_n$' in the lens panel 1' can be set to be equal, it is advantageous that the production be easier than the lens panel 1 relating to the first disclosed embodiment.

In the second disclosed embodiment, a mode can be adopted in which the focal lengths f of the lenses Ln' (×1) to Ln' (×9) in all lens blocks of the lens panel 1' are set to be equal as a constant value, the principal point position of the lens Ln' is shifted, and the object distance a is shortened in sequence. However, it is also possible to set the focal length f from the lens Ln' (×1) to the lens Ln' (×9) in all lens blocks within the lens panel 1' to be equal as a constant and concurrently, to produce the principal point position on the same surface. In other words, if the two-dimensional display body 2 is produced so as to sequentially move the pixel positions from the pixel Pn (×1) to the pixel Pn (×9) closer to the lens panel 1', the object distance a can be sequentially shortened.

Furthermore, the present invention is not limited to the disclosed embodiments. In the explanations of these embodiments, the exemplary dot arrangement configuration is 19 rows×19 columns. However, this configuration can be varied. If the arrangement density of these dots is increased, the number of lenses Ln' in the lens block and the pixels Pn of the pixel block can be increased. Therefore, the number of virtual images producing the three-dimensional image can be increased and concurrently, the depth resolution of the three-dimensional image can be improved. Simultaneously, since the magnification m becomes greater, the virtual distance becomes longer and the depth becomes deeper.

Furthermore, in the explanation of the disclosed embodiments, an example is provided in which a printed body printed onto a clear substrate by the image forming device is used as a two-dimensional display body. In alternate embodiments, however, it is also possible to use a printed body printed onto a white substrate, such as plain paper, by the image forming device, as a two-dimensional display body.

In addition, in the disclosed embodiments, the two-dimensional display body was described as the printed body by the image forming device. In alternate embodiments, however, a two-dimensional display, such as a display panel, can also be used as a two-dimensional display body. In this case, externally-entered three-dimensional image data entered is converted into three-dimensional display data corresponding to the three-dimensional display device relating to the present invention by the information processing device, and is displayed on a two-dimensional display. In this case, if the display by the two-dimensional display is switched equally to two-dimensional motion image at high speed, a three-dimensional display unit that can display a three-dimensional motion image can be configured. In addition, if the display data is produced and displayed in the unit of the pixels Pn, a two-dimensional image can be displayed on a three-dimensional display device.

Furthermore, in the disclosed embodiments, dots are aligned above and below and to the left and right as the pixels Pn of the two-dimensional display body. In alternate embodiments, however, this can be configured such that the dots are aligned only one-dimensionally as the pixels Pn of the two-dimensional display body. In this case, a three-dimensional image can be displayed as usage by matching the direction of the dots aligned with the direction of viewer's eyes aligned.

In addition, it is also possible to configure components of the lens panel and the two-dimensional display body in the units of lens Ln and the pixel Pn, respectively, and they can be configured as a unit in units of the lens block and the pixel block.

Since a three-dimensional image is observed from a hard copy or a two-dimensional display body, the three-dimensional display device relating to the present invention can be used as an exhibition device or display device. Furthermore, since a three-dimensional image can be displayed from a two-dimensional display connected to the information processing device, the three-dimensional display device relating to the present invention is also used as an information terminal. In addition, since the three-dimensional display device relating to the present invention can display highly-accurate information, it is also possible to be used for a display of computer aided data (CAD) design.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A three-dimensional display device, comprising:
   pixel blocks each including pixels, the pixels each having a plurality of dots arranged in a matrix, sets of the pixels at the same positions in the pixel blocks forming images at respective degrees of depth, a number of the images at the respective degrees of depth corresponding to a number of the pixels in each pixel block;
   a display body formed in a matter that the pixel blocks are arranged in a matrix;
   lens blocks each including a plurality of lenses arranged in a matrix and corresponding to the pixels, ones of the plurality of lenses at the same positions in the lens blocks having the same fixed focal length; and
   a lens panel formed in a manner that the lens blocks are arranged in a matrix,
   wherein
   the display body and the lens panel are arranged at a predetermined interval so that the plurality of lenses and the corresponding pixels are aligned with each other, and
   a selected one of the dots in each of the pixels and the ones of the plurality of lenses having the same fixed focal length in the lens blocks that correspond to the pixels are aligned such that the images are virtually formed based on the respective degrees of depth to produce a three-dimensional image.

2. The three-dimensional display device according to claim 1, wherein
   the focal lengths of the plurality of the lenses arranged within the lens blocks are respectively different; and
   the focal lengths of the plurality of the lenses whose arrangement positions are the same among the lens blocks are substantially equal, respectively.

3. The three-dimensional display device according to claim 1, wherein
   object distances between the plurality of the lenses arranged within the lens blocks and the pixels are respectively different; and
   object distances between the plurality of the lenses whose arrangement positions are the same among the lens blocks and the pixels are substantially equal, respectively.

4. The three-dimensional display device according to claim 1, wherein the dots are color dots.

5. The three-dimensional display device according to claim 1, wherein the display body is a printed body that is printed on a medium.

6. An image producing device that produces a plurality of two-dimensional image data with the respective degrees of depth based on entered three-dimensional image data, and that converts the two-dimensional image data into three-dimensional display data, and that produces the printed body according to claim 5 by printing an image based upon the three-dimensional display data onto the medium.

7. The three-dimensional display device according to claim 1, wherein the display body is a two-dimensional display device for displaying images.

8. The three-dimensional display device according to claim 7, wherein the two-dimensional display device displays motion pictures.

9. The three-dimensional display device according to claim 7, wherein the display body is configured to display two-dimensional images.

10. The three-dimensional display device according to claim 1, wherein the images that are virtually formed based on the respective degrees of depth are formed simultaneously.

11. A three-dimensional display device, comprising:
a display body including a plurality of pixel blocks arranged in a pixel block array, each of the pixel blocks including a plurality of pixels arranged in an m×m pixel matrix, each of the pixels including a plurality of dots arranged in an n×n dot matrix, sets of the pixels at the same positions in the pixel blocks forming images at respective degrees of depth, a number of the images at the respective degrees of depth corresponding to a number of the pixels in each pixel block; and
a lens panel including a plurality of lens blocks arranged in a lens block array, each lens block array including a plurality of lenses arranged in an m×m lens array, each of the plurality of lenses corresponding one of the plurality of pixels in a corresponding pixel block, ones of the plurality of lenses at the same positions in the lens blocks having the same fixed focal length,
wherein a three-dimensional image is displayed by maintaining the display body and the lens panel at predetermined interval,
wherein the arrangement of the lens blocks in the lens block array corresponds to the arrangement of the pixel blocks in the pixel block array,
wherein the arrangement of the lenses in each of the lens arrays corresponds to the arrangement pixels in each of the pixel arrays,
wherein virtual images of a selected one of the dots produced by the ones of the plurality of lenses having the same fixed focal length are virtually formed based on the respective degrees of depth, and
wherein m and n are both integers greater than 1.

12. The three-dimensional display device of claim 11,
wherein each of the plurality of lenses in a given one of the plurality of lens blocks has a different focal length; and
wherein the focal lengths of corresponding lenses having the same position in each of the plurality of lens blocks are substantially equal.

13. The three-dimensional display device of claim 11,
wherein an object distance between each of the plurality of lenses in a given one of the plurality of lens blocks and a corresponding pixel in a corresponding pixel block are all different; and
wherein the object distances between corresponding lenses and pixels having the same position in each of the plurality of lens blocks and pixel blocks, respectively, are substantially equal.

14. The three-dimensional display device of claim 11, wherein
the virtual images that are virtually formed based on the respective degrees of depth are formed simultaneously.

15. An image display system, comprising:
an information processing device configured to process a plurality of two-dimensional image data with different degrees of depth based on entered three-dimensional image data, and that converts the plurality of two-dimensional image data into three-dimensional display data;
an image forming device configured to form a printed body by printing pixel blocks and a display body on a medium, wherein pixels having a plurality of dots are arranged in a dot matrix based upon the three-dimensional display data in the pixel blocks, and wherein the display body is formed such that the pixel blocks are arranged in a pixel block matrix, a number of the plurality of two-dimensional image data corresponding to a number of the pixels in each pixel block; and
a three-dimensional display device that has lens blocks in which a plurality of lenses are arranged in a matrix in correspondence with the pixels and a lens panel formed such that the lens blocks are arranged in a lens block matrix, ones of the plurality of lenses in the same position in the lens blocks having the same fixed focal length,
the display body and the lens panel are arranged at a predetermined interval so that the plurality of lenses and the corresponding pixels are aligned with each other, and
a selected one of the dots in each of the pixels and the ones of the plurality of lenses having the same fixed focal length in the lens blocks that correspond to the pixels are aligned such that two-dimensional images are virtually formed based on the respective degrees of depth to produce a three-dimensional image.

16. The image display system of claim 15, wherein
the plurality of two-dimensional image data are at least partially overlapped with each other in order to form the three-dimensional display data.

17. The image display system of claim 15, wherein
the plurality of dots are color dots.

18. The image display system of claim 15, wherein
the two-dimensional images that are virtually formed based on the respective degrees of depth are formed simultaneously.

19. An image display system, comprising:
an information processing device configured to process a plurality of two-dimensional image data with different degrees of depth based on entered three-dimensional image data, and configured to convert the plurality of two-dimensional image data into three-dimensional display data;
an image forming device configured to form a printed body by printing a plurality of pixel blocks and a display body on a medium, wherein pixels, each having an n×n matrix of dots, are arranged in m×m pixel matrices based upon the three-dimensional display data to form the pixel blocks, and wherein the display body is formed such that the pixel blocks are arranged in a pixel block matrix, a number of the plurality of two-dimensional image data corresponding to a number of the pixels in each pixel block; and
a three-dimensional display device that has lens blocks in which a plurality of lenses are arranged in lens matrices in correspondence with the pixel matrices to form the lens blocks, and a lens panel formed such that the lens blocks are arranged in a lens block matrix, ones of the plurality of lenses in the lens blocks having the same fixed focal length, wherein the display body and the lens panel are arranged at a predetermined interval so that the plurality of lenses and the corresponding pixels are aligned with each other, a selected one of the dots in each of the pixels and the ones of the plurality of lenses having the same fixed focal length in the lens blocks that correspond to the pixels are aligned such that two-dimensional images are virtually formed based on the respective degrees of depth to produce a three-dimensional image, and m and n are both integers greater than 1.

20. The image display system of claim 19, wherein
the plurality of two-dimensional image data are partially overlapped with each other in order to form the three-dimensional display data.

21. The image display system of claim 19, wherein
the plurality of dots are color dots.

22. The image display system of claim 19, wherein
the two-dimensional images that are virtually formed based on the respective degrees of depth are formed simultaneously.

* * * * *